United States Patent [19]

Tabata et al.

[11] Patent Number: 4,680,963
[45] Date of Patent: Jul. 21, 1987

[54] SEMICONDUCTOR FLOW VELOCITY SENSOR

[75] Inventors: Osamu Tabata; Hazime Inagaki; Tomoyuki Kitano, all of Aichi, Japan

[73] Assignee: Kabushiki Kaisha Toyota Chuo Kenkyusho, Aichi, Japan

[21] Appl. No.: 820,703

[22] Filed: Jan. 21, 1986

[30] Foreign Application Priority Data

Jan. 24, 1985 [JP] Japan .................. 60-12064

[51] Int. Cl.$^4$ ................................. G01F 1/68
[52] U.S. Cl. .................................... 73/204
[58] Field of Search ............... 73/204; 338/25, 28, 338/308; 29/576 W

[56] References Cited

U.S. PATENT DOCUMENTS

| | | | |
|---|---|---|---|
| 4,129,848 | 12/1978 | Frank et al. | 338/308 |
| 4,320,655 | 3/1982 | Kammermaier et al. | 73/204 |
| 4,343,768 | 8/1982 | Kimura | 73/204 X |
| 4,471,647 | 9/1984 | Jerman et al. | 338/25 X |
| 4,532,700 | 8/1985 | Kinney et al. | 148/DIG. 117 X |
| 4,594,889 | 6/1986 | McCarthy | 73/204 |

FOREIGN PATENT DOCUMENTS

| | | | |
|---|---|---|---|
| 0147221 | 8/1984 | Japan | 73/204 |
| 0094738 | 5/1985 | Japan | 29/576 W |

Primary Examiner—Herbert Goldstein
Attorney, Agent, or Firm—Koda and Androlia

[57] ABSTRACT

A semiconductor flow velocity sensor having a semiconductor substrate and an electrical heating unit arranged on the substrate. The sensor located in the fluid flow to be measured can electrically detect the radiation from the heating unit which varies depending on the velocity of fluid flow. Thermal insulator is provided between the semiconductor (silicon) substrate and the heating unit so as to thermally shield the substrate from the heating unit. On the thermally isolated area of the substrate is provided an external sensor circuit so as to enable to increase the integration of the sensor.

11 Claims, 7 Drawing Figures

SEMICONDUCTOR FLOW VELOCITY SENSOR

BACKGROUND OF THE INVENTION

1. Field of the Invention

The present invention relates to improvements of a semiconductor flow velocity sensor for electrically sensing the velocity of fluid flow.

2. Description of the Prior Art

There is well-known a semiconductor flow velocity sensor comprising a semiconductor substrate and a heating unit on the substrate. Such a sensor is currently used to measure the flow velocity of gaseous or liquid fluid since it can electrically sense the heat transfer from the heating unit which varies depending on the velocity of fluid flow.

In the prior art, however, the silicon substrate and heating unit are not thermally isolated such that the mounts of the sensor and associated substrate will function as thermal loads having a large heat capacity relative to the heating unit. Therefore, measurements cannot accurately be made with a good response time.

Silicon is a very highly thermal conductive material. Therefore, if a heating unit is disposed on a silicon semiconductor substrate, the silicon semiconductor substrate will entirely be heated. In such a situation, peripheral sensor circuits, which are similarly made of semiconductors sensitive to changes in temperature, cannot be located on the same semiconductor substrate on which the heating unit is disposed. This prevents the sensor from being more integrated.

SUMMARY OF THE INVENTION

It is therfore an object of the present invention to provide a semiconductor flow velocity sensor which can accurately measure the velocity of fluid flow with improved response and which can be formed with a higher level of integration.

The present invention provides a semiconductor flow velocity sensor comprising a semiconductor substrate and a heating unit located on the substrate and electrically energized so that the quantity of heat transfer from the heating unit being used to sense the velocity of fluid flow, the improvement comprising heat insulation means between the semiconductor substrate and the heating unit for thermally isolating the substrate from the heating unit, and peripheral sensor circuit means disposed on the thermally isolated portion of the semiconductor substrate.

The semiconductor substrate may be formed of silicon, GaAs or any other semiconductor material.

A portion of the semiconductor substrate under the thermally insulation means may be removed for efficient heat radiation.

When the semiconductor substrate is of silicon, the heat insulating means is preferably of an oxidized porous silicon layer. The oxidized porous silicon layer has a heat conductivity in the order of 1/50-1/100 times that of the silicon and may be formed into on the silicon semiconductor substrate to a thickness of 10 microns or more for a reduced period of time. Such an oxidized porous silicon layer serves as a very superior heat insulator.

Since the oxidized porous silicon layer also is superior in electrical insulation, it can reduce leakage of current from the heating unit to the semiconductor substrate to a very low level. Only by forming a protective layer of $Si_3N_4$ or the like integrally on the surface of the semiconductor substrate comprising the heating unit and the peripheral sensor circuit as by sputtering, such a protective layer can efficiently insulate the heating unit particular electrically, from a fluid to be measured. As a result, measurements can be carried out within the flow of an electrically conductive fluid.

The heating unit may be of any suitable heating material. For example, a heating unit may be formed on a semiconductor substrate by leaving a portion of the substrate in a thermal insulating member when the thermal insulation member is selectively formed in the substrate. Alternatively, a portion of the semiconductor substrate selectively left within a thermal insulation member may be subjected to impurity diffusion to form a resistor or transistor which can be used as a heating unit. Furthermore, the thermal insulating member may selectively be formed on a substrate with the surface thereof being formed with a film-like resistor or transistor which can be utilized as a heating unit.

When it is desired to measure the velocity of fluid flow, a semiconductor sensor according to the present invention is first located within the flow of fluid and its heating unit is then energized. When the fluid flows about the heating unit, the quantity of heat taken from the heating unit by the flowing fluid varies depending on the velocity of the fluid flow. The quantity of the taken heat increases as the velocity of the flowing fluid increases.

Thus, the sensor according to the present invention can measure the velocity of the fluid flowing thereabout by electrically caluculating the quantity of heat transfered from the heating unit.

Upon detection of the flow velocity, the response of the sensor becomes faster as the thermal load of the heating unit is reduced. In accordance with the present invention, the heating unit is effectively thermally insulated from the semiconductor substrate by means of the thermal insulation member. Therefore, the semiconductor substrate and mount thereof do not act as thermal loads relative to the heating unit. In the sensor according to the present invention, accordingly, almost all of heat transfered from the heating unit can be absorbed by the flowing fluid to be measured so that the quantity of heat from the heating unit can very effectively respond to the velocity of fluid flow, which can be measured with higher accuracies.

Since the sensor according to the present invention comprises a heating unit efficiently thermally insulated from the semiconductor substrate by the thermal insulation as described hereinbefore. The temperature in the semiconductor substrate not only becomes substantially equal to that of the fluid flowing about the sensor but also is not heated to raised temperatures as in the prior art. As a result, peripheral sensor circuits, which are sensitive to changes in temperature and tend to be damaged by heat, can be provided on the same semiconductor substrate on which the heating unit is disposed. Therefore, the integration of the sensor can be increased. For example, if necessary, a driver for the heating unit, a sensor output linearizing circuit and fluid temperature and pressure compensating circuits may effectively be located on the same semiconductor substrate.

When the above fluid temperature and pressure compensating circuits are provided on the semiconductor substrate of the sensor, the temperature and pressure of a fluid in addition to the flow velocity thereof can simultaneously be measured at substantially the same point of measurement to compensate for the output of the sensor. Even if a flowing fluid is complicatedly variable with respect to temperature and pressure, the flow velocity of the fluid can accurately be measured by the sensor according to the present invention. Such an advantage can be improved more since the semiconductor sensor is more miniaturized in accordance with one of the fine machinings well-known in the field of semiconductor technique.

Since in actual measurements, the output of the sensor is more influenced by changes of the fluid temperature rather than changes of the fluid pressure, it is preferred that a fluid temperature compensating circuit is provided on a semiconductor substrate to form a more integrated sensor.

Further, since a semiconductor is used as the substrate in this invention, various kinds of complicated peripheral sensor circuits other than the above described can be provided on the substrate to form a more integrated sensor.

DETAILED DESCRIPTION OF PREFERRED EMBODIMENTS

Figure 1:
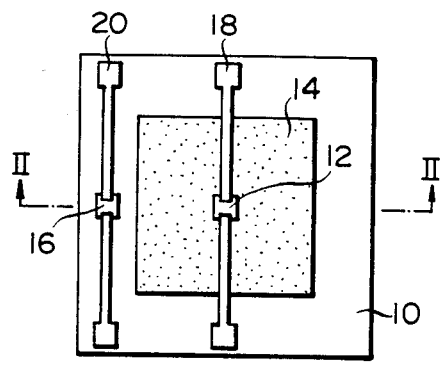
FIG. 1 is a plan view of a first preferred embodiment of a semiconductor flow velocity sensor according to the present invention.
Figure 2:
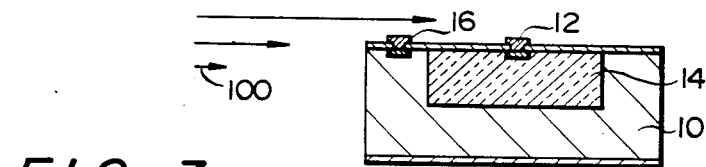
FIG. 2 is a cross-sectional view of the sensor taken along a line II—II in FIG. 1.

Referring to FIGS. 1 and 2, there is shown a semiconductor flow velocity sensor according to the present invention which comprises a substrate 10 of P-type silicon semiconductor and of a thickness equal to 400 microns, an electrically energized heating unit 12 located on the surface of the substrate 10 at the center and a thermal insulator 14 disposed between the heating unit 12 and the substrate 10 and having a thickness equal to 50 microns.

In this illustrated embodiment, the thermal insulator 14 is formed by selectively processing a portion of the P-type silicon semiconductor substrate 10 into a porous area and then oxidizing the porous area to form an oxidized porous silicon layer.

The heating unit 12 is formed of non-porous N-type silicon layer located on the surface of the thermal insulator 14 at the center.

The oxidized porous silicon layer defining the thermal insulator 14 may be formed in accordance with one of the various well-known processes. It will now be described below.

The P-type silicon semiconductor substrate 10 is first submerged in an HF solution. When a current is applied such that the substrate 10 acts as an anode and the HF solution as a cathode, a porous area is formed on the surface of the P-type silicon semiconductor substrate 10 along the path of current. Non-porous areas can be obtained by pre-forming $Si_3N_4$ layers on those areas or pre-forming them into an N-type. Thus, the substrate 10 can selectively be processed to obtain porous and non-porous areas separate from each other.

When the silicon semiconductor substrate 10 includes N-type area (or areas) on the surface, a region (or regions) therebelow can be processed into porous properties by continuing the process for sufficient periods of time.

In the sensor shown in FIGS. 1 and 2, an N-type area corresponding to the heating unit 12 is pre-formed on the surface of the P-type silicon semiconductor substrate 10 at the center. The semiconductor substrate 10 is then processed sufficiently to have a porous property and thereafter oxidized to form an oxidized porous silicon layer or thermal insulator 14 of a desired thickness between the heating unit 12 and the silicon semiconductor substrate 10.

The thermal insulator 14 thus formed functions to efficiently thermally shield the semiconductor substrate 10 from the heating unit 12. Thus, any undesirable increase of temperature in the semiconductor substrate 10 can effectively be prevented.

In the illustrated embodiment, the semiconductor substrate 10 also includes an N-type silicon resistor 16 formed on the surface thereof, the resistor 16 being used as a peripheral sensor circuit. This N-type silicon resistor 16 is used as a fluid temperature compensating circuit and has a resistance sufficiently higher than that of the heating unit 12 so that the resistor 16 will not have a self-heating property. In the illustrated embodiment, the resistor 16 has a resistance about 100 times that of the heating unit 12. The resistance temperature coefficient of the N-type silicon resistor 16 is selected to be substantially equal to that of the heating unit 12 such that measurement of temperature in the fluid flow can efficiently be carried out.

The semiconductor substrate 10 further includes Al leads 18 and 20 formed on the surface thereof and electrically connected with the heating unit 12 and N-type silicon resistor 16, respectively.

In use, the flow velocity sensor according to the present invention is located in the flow of a fluid to be measured. The heating unit 12 is then energized to maintain the surface temperature of the heating unit 12 constant.

Since the quantity of heat taken from the heating unit 12 by the flowing fluid is proportional to the 1/n-th power of the velocity v of the flowing fluid 100, the Joule heat Q generated from the heating unit 12 can electrically be measured and calculated to know the velocity of the flowing fluid. The character "n" used herein is a constant determined depending on the configuration and other factors of the sensor.

Since the sensor according to the present invention includes the thermal insulator 14 for efficiently shielding the semiconductor substrate 10 from the heating unit 12, the thermal load of the heating unit 12 is very small with the heat value thereof responding more sensitively to the flow velocity v of the fluid 100. By the use of the sensor according to the present invention, therefore, the flow velocity v of the fluid 100 can accurately be measured with fast response.

As previously described, the sensor according to the present invention includes the thermal insulator 14 disposed within the semiconductor substrate 10 to provide a smooth surface in the substrate 10. This means that the flow of the fluid 100 will not be disturbed by the sensor located therewithin. As a result, the flow velocity v of the fluid 100 can more accurately by measured.

In this measurement if the temperature of the flowing fluid 100 is constant, the quantity of heat taken from the heating unit 12 is properly proportional to the velocity of the flowing fluid. If the temperature of the fluid flowing at an unvariable velocity is changed from one level to other, however, the quantity of heat taken from the heating unit 12 also is variable. As a result, measurement cannot accurately be made.

In such a case, it is required that a difference between the temperatures of the heating unit 12 and fluid is controlled to be constant. To this end, the sensor according to the present invention comprises the N-type silicon resistor 16 functioning as a temperature sensor located on the surface of the semiconductor substrate 10. The output of the silicon resistor 16 is used to control the temperature of the heating unit 12 to provide a constant difference in temperature between the heating unit 12 and the fluid.

In such a manner, the sensor according to the present invention can be used to more accurately measure the velocity v of the flowing fluid even though the temperature thereof is variable.

In accordance with the present invention, moreover, the temperature of the semiconductor substrate 10 becomes substantially equal to that of the flowing fluid by the presense of the thermal insulator 14. Even if the semiconductor substrate 10 includes a peripheral sensor circuit (for example, N-type silicon resistor 16 in the illustrated embodiment) located on the surface thereof to increase its integration, therefore, such a peripheral sensor cirucit can be operated more stably.

A driver circuit for driving the sensor according to the present invention in accordance with the constant temperature measuring process will be described below.

Figure 3:
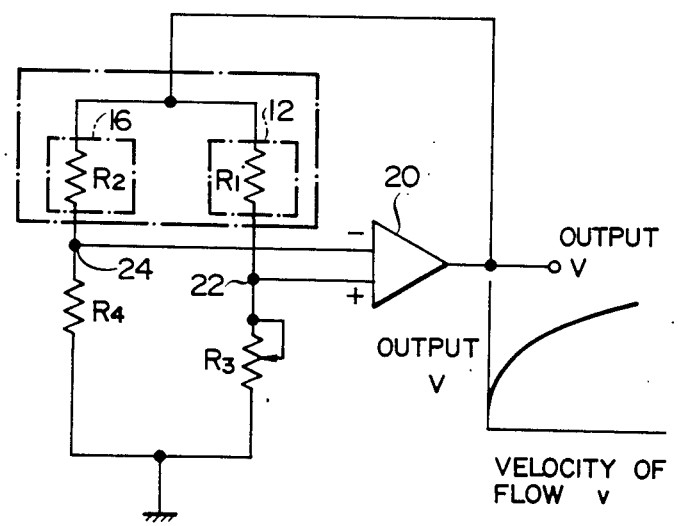
FIG. 3 is a circuit diagram of a drive used in the sensor shown in FIGS. 1 and 2.

Referring to FIG. 3, there is shown a drive circuit comprising an N-type silicon resistor R1 used as the heating unit 12, an N-type silicon resistor R2 functioning as the fluid temperature compensating circuit 16 and resistors R3 and R4, all of which form a bridge circuit together. The bridge circuit is connected with a differential amplifier 20 to form a feedback circuit which functions to amplify the output of the bridge circuit to provide a power supply for this bridge circuit.

Such a drive circuit is generally well-known as a constant temperature difference drive circuit for hot wires or film sensors.

For example, where the sensor according to the present invention is disposed within the flow of the fluid 100 to measure the velocity thereof, the quantity of heat taken from the heating unit 12, that is, the N-type silicon resistor R1, by the flowing fluid increases as the velocity of the fluid flowing about the sensor increases. Therefore, the temperature of the resistor R1 decreases to provide a reduced resistance thereof. As a result, there is provided an increased voltage at a junction 22 between the resistors R1 and R3.

Since the junction 22 also is connected with the positive input terminal of the differential amplifier 20, the output voltage of the amplifier 20 also is increased to provide an increased input voltage to the bridge circuit.

Voltage applied to the heating unit 12 is then increased to increase the thermal energy due to the Joule heat correspondingly generated by the heating unit 12. Therefore, the temperature of the resistor R1 will be increased to increase the resistance thereof to the level prior to increase of the flow velocity. In this manner, the bridge circuit will be balanced.

Since the drive circuit maintains the temperature of the resistor R1 constant under the action of the feedback circuit even if the flow velocity of the fluid is variable, the quantity of Joule heat generated at the heating unit 12 is properly proportional to the output voltage of the differential amplifier 20 which in turn can be used to determine the flow velocity of the fluid.

Even if the temperature of the flowing fluid 100 is variable, the flow velocity thereof can accurately be measured by determining changes in the resistance of resistor R2.

In the illustrated embodiment, the N-type silicon resistor 16 functioning as a temperature compensating cirucit is selected to have a resistance R2 sufficiently higher than the resistance R1 of the heating unit 12 as described hereinbefore. Therefore, the resistor 16 will not be self-heated even in such a bridge circuit as shown in FIG. 3. If the temperature of the flowing fluid 100 decreases, the resistance R2 also decreases, so that there will be provided an increased voltage at a junction 24 between the resistors R2 and R4.

The resistance temperature coefficient of the resistor R2 is set to be substantially equal to that of the resistor R1 functioning as the heating unit 12. When the temperature of the flowing fluid 100 decreases, therefore, voltages at the respective junctions 22 and 24 are increased in a constant rate. Since the junction 24 is connected with the negative input terminal of the differential amplifier 20, the increase of the voltage at the junction 22 on decrease of the temperature is offset by that at the junction 24 to provide an output of the differential amplifier 20.

Even if the temperature of the flowing fluid 100 is variable, the drive circuit functions to maintain the difference in temperature between the heating unit 12 and the fluid 100 constant. As a result, the differential amplifier 20 can always provide an output voltage V properly proportional to the flow velocity v of the fluid 100 irrespective of changes in the temperature thereof.

By calculating such an output voltage V, the flow velocity v of the fluid 100 can accurately be measured irrespective of changes in the temperature thereof.

Figure 4:
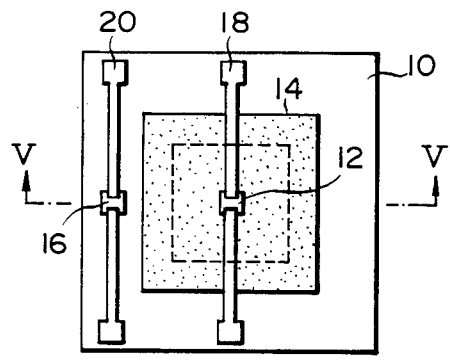
FIG. 4 is a plan view of a second preferred embodiment of the sensor according to the present invention.
Figure 5:
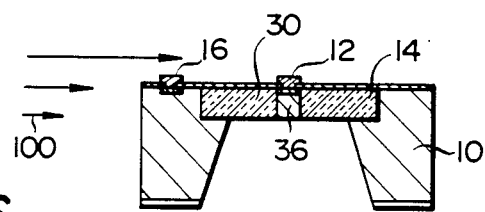
FIG. 5 is a cross-sectional view of the sensor taken along a line V—V in FIG. 4.

FIGS. 4 and 5 show a second preferred embodiment of the semiconductor sensor according to the present invention.

In the second preferred embodiment, a semiconductor substrate 10 includes a portion formed into a thin-walled or sheet-shaped configuration. The thin-walled portion of the substrate 10 is partially processed into a thermal insulator which can more efficiently shield the semiconductor substrate 10 thermally from a heating unit 12.

To this end, a portion of the semiconductor substrate 10 having a square-shaped surface is processed to be porous. The processed portion is oxidized to form an oxidized porous silicon layer used as a thermal insulator 14, as in the first embodiment. Then a portion of the semiconductor substrate under the oxidized porous silicon layer is etched from the bottom to form a substantially square sheet-shaped portion 30 including the thermal insulator 14. An N-type silicon resistor functioning as the heating unit 12 is pre-formed on the surface of the sheet substrate portion 30 at the center as in the first embodiment. The area other than the N-type silicon resistor is formed as the thermal insulator 14.

In such an arrangement, the thin-walled or sheet-shaped poriton 30 of the substrate 10 serves as a means for efficient heat radiation. Consequently, the semiconductor substrate 10 can more efficiently be shielded from the heating unit 12.

Since the sensor of the second embodiment is superior in heat shielding property, it can have sufficient thermal insulation even if a non-porous P-type silicon 36 is left below the heating unit 12 as shown in FIG. 5 or even if the porous silicon oxide layer has a thickness smaller than that of the first embodiment.

Figure 6:
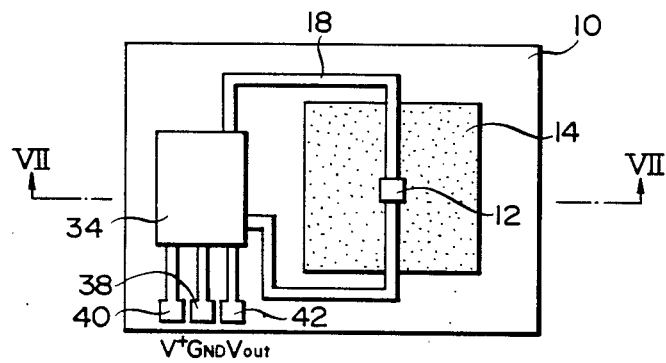
FIG. 6 is a plan view of a third preferred embodiment of the sensor according to the present invention.
Figure 7:
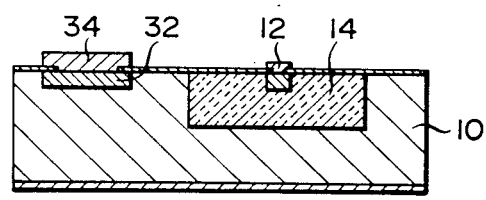
FIG. 7 is a cross-sectional view of the sensor taken along a line VII—VII in FIG. 6.

Referring to FIGS. 6 and 7, there is shown a third preferred embodiment of the semiconductor sensor according to the present invention which is characterized in that a peripheral sensor circuit 34 similar to the drive circuit shown in FIG. 3 is provided on the surface of the semiconductor substrate 10 to further increase the integration of the sensor.

Such a peripheral sensor circuit 34 on the semiconductor substrate 10 may readily be formed in an n-well 32 provide on the semiconductor substrate 10 by the use of a conventional bipolar process.

The semiconductor substrate 10 also includes three A1 leads 30, 40 and 42 formed thereon at locations Gd, V+ and V, which are used to supply power to the peripheral sensor circuit and to fetch the output of the same circuit, respectively.

Although the invention has been described as to the N-type silicon resistor 16 or the peripheral sensor circuit such as the drive circuit 34 on the semiconductor substrate 10, the semiconductor substrate 10 may include peripheral sensor circuits of various complicated forms other than the above circuits to increase the integration of the sensor.

We claim:

1. A semiconductor flow velocity sensor comprising:
   a semiconductor substrate;
   a thermal insulation means which is formed by selectively making a portion of said semiconductor substrate porous and oxidizing said portion to form an oxidized porous silicon layer in such a manner that the surface of said thermal insulation means is exposed substantially flush with the surface of said semiconductor substrate;
   an electrically energized heating unit formed of a part of the inner portion of said thermal insulation means, which has selectively been left when forming said thermal insulation means, in such a manner that the surface of said electrically energized heating unit is exposed substantially flush with the surface of said semiconductor substrate; and
   peripheral sensor circuit means provided on said semiconductor substrate at the portion at which the heat transfer from said electrically energized heating unit is prevented by said thermal insulation means;
   said surface of said semiconductor substrate which is provided with said electrically energized heating unit and said thermal insulation means being made substantially flat, thereby enabling stable detection of flow velocity over a long period of time without disturbing the flow of a fluid while being protected against contamination.

2. A semiconductor flow velocity sensor as defined in claim 1 wherein said semiconductor substrate is formed of one selected from P- and N-type silicon and wherein said thermal insulation means is formed of an oxidized porous silicon layer.

3. A semiconductor flow velocity sensor as defined in claim 2 wherein the surface of said semiconductor substrate is covered with a protective insulation layer, whereby measurement of flow velocity can be made even in the flow of an electrically conductive fluid.

4. A semiconductor flow velocity sensor as defined in claim 2 wherein said thermal insulation means is formed by selectively processing a portion of a silicon semiconductor substrate to make said portion porous and then oxidizing said portion to form an oxidized porous silicon layer thereon and wherein said heating unit is formed by leaving a portion of said substrate within said thermal insulation means.

5. A semiconductor flow velocity sensor as defined in claim 4 wherein said heating unit is then subjected to impurity diffusion.

6. A semiconductor flow velocity sensor as defined in claim 2, wherein said heating unit is a film-like resistor.

7. A semiconductor flow velocity sensor as defined in claim 1, wherein a portion of said semiconductor susbstrate under said thermally insulation means is removed for efficient heat radiation.

8. A semiconductor flow velocity sensor as defined in claim 7, wherein said portion is removed by etching.

9. A semiconductor flow velocity sensor as defined in claim 1 wherein said peripheral sensor circuit means is a fluid temperature compensating circuit.

10. A semiconductor flow velocity sensor as defined in claim 9 wherein said fluid temperature compensating circuit is formed of a silicon resistor, the resistance of said silicon resistor being sufficiently higher than that of said heating unit, and further the resistance temperature coefficient of said silicon resistor being substantially equal to that of said heating unit.

11. A semiconductor flow velocity sensor as defined in claim 1 wherein said peripheral sensor circuit means includes a drive circuit for said heating unit, a sensor output linearizing circuit and a fluid pressure compensating circuit.

* * * * *